United States Patent
Fujie et al.

(10) Patent No.: US 7,867,411 B2
(45) Date of Patent: Jan. 11, 2011

(54) METHOD FOR PRODUCING SYNTHESIS GAS AND APPARATUS FOR PRODUCING SYNTHESIS GAS

(75) Inventors: Hirokazu Fujie, Ibaraki-ken (JP); Nobuhiro Yamada, Ibaraki-ken (JP); Ichiro Kitahara, Kanagawa-ken (JP); Yoshiyuki Watanabe, Kanagawa-ken (JP)

(73) Assignees: JGC Corporation, Tokyo (JP); Osaka Gas Co., Ltd., Osaka (JP)

( * ) Notice: Subject to any disclaimer, the term of this patent is extended or adjusted under 35 U.S.C. 154(b) by 641 days.

(21) Appl. No.: 11/577,152

(22) PCT Filed: Oct. 13, 2005

(86) PCT No.: PCT/JP2005/018880
§ 371 (c)(1), (2), (4) Date: Jun. 8, 2007

(87) PCT Pub. No.: WO2006/041133
PCT Pub. Date: Apr. 20, 2006

(65) Prior Publication Data
US 2007/0295937 A1 Dec. 27, 2007

(30) Foreign Application Priority Data
Oct. 13, 2004 (JP) .............................. 2004-298971

(51) Int. Cl.
*C01B 3/26* (2006.01)
(52) U.S. Cl. .................... 252/373; 423/418.2; 423/651; 423/652
(58) Field of Classification Search ................. 252/373; 423/418.2, 651, 652
See application file for complete search history.

(56) References Cited

U.S. PATENT DOCUMENTS

| | | | | |
|---|---|---|---|---|
| 2,942,958 A * | 6/1960 | Dwyer | ...................... | 48/198.7 |
| 3,264,066 A * | 8/1966 | Quartulli et al. | ............ | 423/654 |
| 6,048,472 A * | 4/2000 | Nataraj et al. | ............... | 252/373 |
| 6,059,995 A * | 5/2000 | Topsoe et al. | ............... | 252/373 |
| 6,110,979 A * | 8/2000 | Nataraj et al. | ............... | 518/704 |
| 6,221,280 B1 * | 4/2001 | Anumakonda et al. | ...... | 252/372 |
| 6,726,850 B1 * | 4/2004 | Reyes et al. | .................. | 252/373 |
| 7,261,751 B2 * | 8/2007 | Dutta et al. | ................. | 48/198.1 |
| 7,585,339 B2 * | 9/2009 | Dahl et al. | ............. | 48/197 FM |
| 7,622,058 B2 * | 11/2009 | Garg et al. | ................... | 252/373 |
| 2004/0077496 A1 * | 4/2004 | Zhao et al. | .................. | 502/328 |
| 2006/0255319 A1 * | 11/2006 | Sadikay | ...................... | 252/373 |

FOREIGN PATENT DOCUMENTS

| | | |
|---|---|---|
| JP | 61-122102 | 6/1986 |
| JP | 06-219706 | 8/1994 |
| JP | 2004-203722 | 7/2004 |
| WO | WO-98/49095 | 11/1998 |

* cited by examiner

*Primary Examiner*—Wayne Langel
(74) *Attorney, Agent, or Firm*—Leason Ellis LLP

(57) ABSTRACT

A method for producing a synthesis gas containing carbon monoxide and hydrogen from a source gas containing light hydrocarbons, includes the steps of: performing low temperature steam reforming by adding steam to the source gas and converting hydrocarbons of carbon numbers of 2 or higher in the source gas to methane; and performing a catalytic partial oxidation by adding oxygen after the low temperature steam reforming.

4 Claims, 1 Drawing Sheet

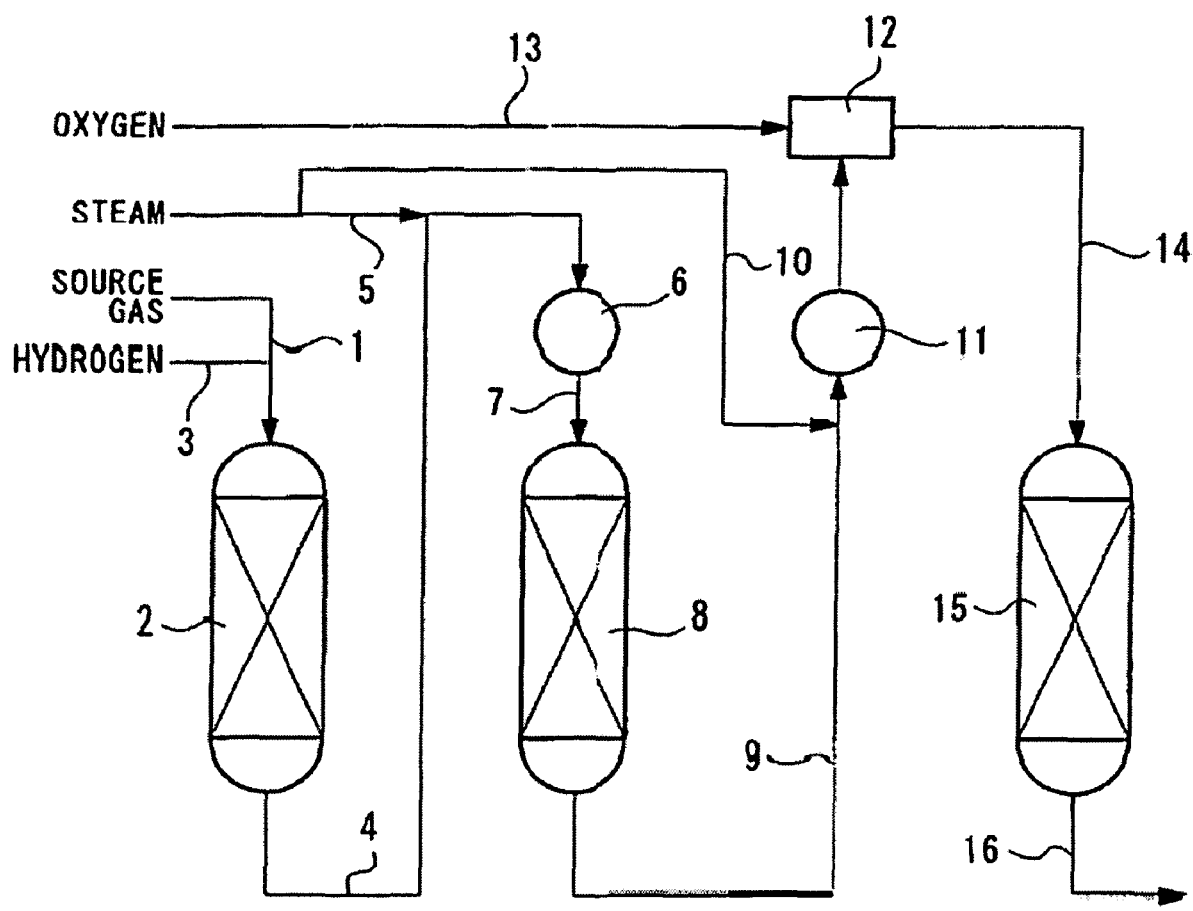

METHOD FOR PRODUCING SYNTHESIS GAS AND APPARATUS FOR PRODUCING SYNTHESIS GAS

TECHNICAL FIELD

The present invention relates to a method and apparatus for producing synthesis gas containing carbon monoxide and hydrogen by catalytically partially oxidizing source gas containing light hydrocarbons (e.g., natural gases) thereby reducing self combustion of hydrocarbons of carbon numbers of 2 or higher in the catalytic partial oxidation process.

Priority is claimed on Japanese Patent Application No. 2004-298971, filed Oct. 13, 2004, the content of which is incorporated herein by reference.

BACKGROUND ART

Technologies has been researched and developed for producing synthesis gas containing carbon monoxide and hydrogen from light hydrocarbons (e.g., natural gases) as a feedstock and then synthesizing fuel oil (e.g., kerosene, light oil, methanol) from the synthesis gas as a feedstock (such technique is referred to as the GTL technology).

For this purpose, the catalytic partial oxidation method (CPO) is known as one method for producing synthesis gas from light hydrocarbons.

This catalytic partial oxidation method is a method for producing synthesis gas. In this method, oxygen is added to source gas, such as natural gas containing light hydrocarbons (e.g., methane), which is fed to a reactor. The light hydrocarbons (e.g., methane, ethane) are converted to carbon monoxide and hydrogen by the action of a catalyst, such as nickel, ruthenium, rhodium, platinum, provided within the reactor (see the chemical equation described below).

$$C_mH_n + m/2 O_2 = mCO + n/2 H_2$$

However, source gases, such as natural gases, often contain about between 5% and 20% of hydrocarbons of carbon numbers of 2 or higher (e.g., ethane, propane, butane, other than methane). Since such hydrocarbons of carbon numbers of 2 or higher have lower ignition temperatures than that of methane, they are liable to combust when mixed with oxygen and to be catalytically oxidized. As a result, there is a high possibility that such gases self combust in an oxygen mixer or a preheater that is located in the upstream of the catalyst layer of the catalytic partial oxidation reactor, which may present a great obstacle in terms of safety in designing apparatuses.

Furthermore, as for hydrocarbons of carbon numbers of 2 or higher, each hydrocarbon has a different ignition temperature and a different combustion concentration range. Therefore, the self combustion temperature of source gas varies depending on the ratio among hydrocarbons of carbon numbers of 2 or higher in the source gas, which makes the reaction control difficult.

In order to address such disadvantages, International Patent Publication No. WO98/49095 discloses the invention in which an injector having a plurality of mixing nozzles is attached to an inlet of a catalytic partial oxidation reactor so that hydrocarbon gas and oxygen gas are mixed under a high lineal speed condition where they do not self combust, and they are then fed to a catalyst layer of a partial oxidation reactor.

Patent Document 1: International Patent Publication No. WO98/49095

DISCLOSURE OF INVENTION

Problem to be Solved by the Invention

Accordingly, the problem to be solved by the present invention is to prevent self combustion caused by hydrocarbons of carbon numbers of 2 or higher in source gas containing light hydrocarbons (e.g., natural gas) when producing synthesis gas from the source gas by means of the catalytic partial oxidation method.

Means for Solving Problem

In order to solve the problem described above, a first aspect of the present invention is a method for producing a synthesis gas containing carbon monoxide and hydrogen from a source gas containing light hydrocarbons, including the steps of: performing low temperature steam reforming by adding steam to the source gas and converting hydrocarbons of carbon numbers of 2 or higher in the source gas to methane; and performing a catalytic partial oxidation by adding oxygen after the low temperature steam reforming.

In the above-described method for producing a synthesis gas, a pressure may be set between the normal pressure to 8 MPa, an inlet temperature may be set between 200° C. and 500° C., an outlet temperature may be set between 300° C. and 600° C., the added amount of the steam may be set between 0.1 mol to 3.0 mol with respect to 1 mol of carbon in the source gas in a first reactor for the low temperature steam reforming.

In the above-described method for producing a synthesis gas, an inlet temperature may be set to 300° C. or higher, and the added amount of the oxygen may be set to 0.2 mol or more with respect to 1 mol of carbon in the source gas in a second reactor for the catalytic partial oxidation.

In the above-described method for producing a synthesis gas, the source gas may be a natural gas, or naphtha, or a liquefied petroleum gas.

A second aspect of the present invention is an apparatus for producing a synthesis gas containing carbon monoxide and hydrogen, including: a low temperature steam reforming reactor that converts hydrocarbons of carbon numbers of 2 or higher in a source gas containing light hydrocarbons to methane; and a catalytic partial oxidation reactor that converts the produced gas from the low temperature steam reforming reactor to the synthesis gas.

The above-described apparatus for producing a synthesis gas may further include a heat exchanger that is provided between the low temperature steam reforming reactor and the catalytic partial oxidation reactor, for heating the gas from the low temperature steam reforming reactor.

The above-described apparatus for producing a synthesis gas may further include a desulfurization reactor that is provided at a stage previous to the low temperature steam reforming reactor; and a heat exchanger that is provided between desulfurization reactor and the low temperature steam reforming reactor, for heating the gas from the desulfurization reactor.

Effect of the Invention

According to the present invention, hydrocarbons of carbon numbers of 2 or higher contained in light hydrocarbons (e.g., natural gases, naphtha) are converted to methane by means of the low temperature steam reforming. Consequently self combustion of the source gas can be eliminated in the catalytic partial oxidation process on the next stage.

Accordingly, safety of operations during the catalytic partial oxidation can be improved. Furthermore, it is possible to easily take necessary measures when any change in the composition of the source gas occurs.

Furthermore, since self combustion is prevented, the temperature of the gas fed to the catalytic partial oxidation reactor can be set to a temperature about 200° C. higher than that used for conventional techniques. As a result, it is possible to reduce the amount of oxygen required for the catalytic partial oxidation reaction.

BRIEF DESCRIPTION OF THE DRAWING

FIG. 1 is a schematic block diagram illustrating one example of an apparatus for producing synthesis gas according to the present invention.

DESCRIPTION OF THE REFERENCE SYMBOLS

6 ... heat exchanger, 8 ... low temperature steam reforming reactor, 12 ... mixer, 15 ... catalytic partial oxidation reactor

BEST MODE FOR CARRYING OUT THE INVENTION

Hereinafter, the present invention will be described in detail with reference to the specific examples thereof.

FIG. 1 is a schematic block diagram illustrating one example of an apparatus for producing synthesis gas according to the present invention.

Source gas containing light hydrocarbons (e.g., natural gases) is fed to a desulfurization reactor 2 through a pipe 1. At the same time, hydrogen for hydrogenation is also supplied to the desulfurization reactor 2 through a pipe 3.

As the desulfurization reactor 2 in this case, an absorber that reduces sulfur compounds in the source gas with the hydrogen to generate hydrogen sulfide and removes the hydrogen sulfide by adsorbing it may be used, for example.

The source gas that has undergone the desulfurization process is drawn through a pipe 4, is mixed with steam through a pipe 5, and is thereafter fed to a first heat exchanger 6. After heated between 200° C. and 500° C. in the first heat exchanger 6, the source gas is fed to a low temperature steam reforming reactor 8 via a pipe 7.

The low temperature steam reforming reactor 8 includes a catalyst bed therewithin, the catalyst bed being filled with a catalyst having a metal, such as nickel and/or ruthenium, supported on a carrier, e.g., aluminum oxide. In the reactor 8, hydrocarbons of carbon numbers of 2 or higher in the source gas react with the steam by the action of the catalyst and are converted to methane, and a small quantity of carbon oxides is generated as a byproduct.

Operation conditions in the low temperature steam reforming reactor 8 is as follows: the pressure is set between the normal pressure and 8 MPa, preferably between 1 MPa and 4 MPa; the inlet temperature is set between 200° C. and 500° C., preferably between 300° C. and 400° C.; the outlet temperature is set between 300° C. and 600° C., preferably between 400° C. and 550° C.; and the added amount of the steam is set to 0.1 mol and 3.0 mol, preferably between 0.3 mol and 1.0 mol with respect to 1 mol of carbon in the source gas.

The produced gas from the low temperature steam reforming reactor 8 containing methane and a small quantity of carbon oxides through a pipe 9 is, together with steam through a pipe 10, fed to a second heat exchanger 11 in which the gas is heated between 300° C. and 550° C. and is fed to a mixer 12.

Oxygen is supplied separately via a pipe 13 to the mixer 12 in which the oxygen is mixed with the mixed gas of the produced gas described above and the steam. The steam added at this point is for preventing coking of a catalyst of a catalytic partial oxidation reactor 15.

The added amount of the oxygen in the mixer 12 is adjusted in a range between 0.2 mol and 1.0 mol, preferably between 0.3 mol and 0.8 mol, with respect to 1 mol of carbon in the gas in terms of the oxygen content at an outlet of the mixer 12, and can be higher than oxygen contents used in conventional methods. Such a higher content is possible because the catalytic partial oxidation reaction process in the next stage experiences less self combustion.

The gas from the mixer 12 is fed to the catalytic partial oxidation reactor 15 via the pipe 14.

The catalytic partial oxidation reactor 15 includes a catalyst bed therewithin, the catalyst bed being filled with a catalyst having one or metals selected from the group consisting of nickel, ruthenium, rhodium, and platinum supported on a carrier (e.g., alumina, silica). Methane and oxygen in the gas that is introduced to the catalytic partial oxidation reactor 15 react, and synthesis gas containing carbon monoxide and hydrogen is obtained.

Operation conditions in the catalytic partial oxidation reactor 15 is as follows: the pressure is set between the normal pressure and 8 MPa; the inlet temperature is set between 300° C. and 550° C.; and the outlet temperature is set between 700° C. and 1200° C.

The synthesis gas generated in the catalytic partial oxidation reactor 15 is drawn through a pipe 16 and is fed to the next step.

Such a method for producing synthesis gas is designed so that the low temperature steam reforming reactor 8 is provided to the stage previous to the catalytic partial oxidation reactor 15, and that hydrocarbons of carbon numbers of 2 or higher in the source gas are converted to methane in the low temperature steam reforming reactor 8, which is led to the catalytic partial oxidation reactor 15. As a result, since hydrocarbons of carbon numbers of 2 or higher does not enter into the catalytic partial oxidation reactor 15, it is possible to prevent self combustion of the hydrocarbons of carbon numbers of 2 or higher somewhere between the mixer 12 and the upstream of the catalyst layer of the catalytic partial oxidation reactor 15.

Table 1 shows one example of changes in the gas composition of at the inlet and the outlet of the low temperature steam reforming reactor 8 using natural gas as a feedstock. The table shows that the gas was converted to the one that was substantially free from hydrocarbons of carbon numbers of 2 or higher (e.g., ethane, propane).

TABLE 1

|  | Reactor Inlet | | | Reactor Outlet | | |
| --- | --- | --- | --- | --- | --- | --- |
|  | (mol/hr) | (mol %) | (Dry mol %) | (mol/hr) | (mol %) | (Dry mol %) |
| $CH_4$ | 718.36 | 51.717 | 86.97 | 908.81 | 62.367 | 94.44 |
| $C_2H_6$ | 58.48 | 4.210 | 7.08 | 0.00 | 0.000 | 0.00 |
| $C_3H_8$ | 23.09 | 1.662 | 2.80 | 0.00 | 0.000 | 0.00 |
| $n\text{-}C_4H_{10}$ | 5.11 | 0.368 | 0.62 | 0.00 | 0.000 | 0.00 |
| $i\text{-}C_4H_{10}$ | 4.46 | 0.321 | 0.54 | 0.00 | 0.000 | 0.00 |
| $n\text{-}C_5H_{12}$ | 0.00 | 0.000 | 0.00 | 0.00 | 0.000 | 0.00 |

TABLE 1-continued

| | Reactor Inlet | | | Reactor Outlet | | |
|---|---|---|---|---|---|---|
| | (mol/hr) | (mol %) | (Dry mol %) | (mol/hr) | (mol %) | (Dry mol %) |
| n-$C_6H_{14}$ | 0.00 | 0.000 | 0.00 | 0.001 | 0.000 | 0.00 |
| $C_nH_m$ | 0.00 | 0.000 | 0.00 | 0.00 | 0.000 | 0.00 |
| $H_2$ | 16.52 | 1.189 | 2.00 | 19.43 | 1.333 | 2.02 |
| CO | 0.00 | 0.000 | 0.00 | 0.05 | 0.004 | 0.01 |
| $CO_2$ | 0.00 | 0.000 | 0.00 | 34.03 | 2.336 | 3.54 |
| $O_2$ | 0.00 | 0.000 | 0.00 | 0.00 | 0.000 | 0.00 |
| $N_2$ | 0.00 | 0.000 | 0.00 | 0.00 | 0.000 | 0.00 |
| $H_2O$ | 563.00 | 40.532 | — | 494.88 | 33.961 | — |
| Total | 1389.03 | 100.000 | 100.00 | 1457.20 | 100.000 | 100.00 |

Furthermore, since substantially no hydrocarbons of carbon numbers of 2 or higher which combusts at low temperatures remain, the autogenous ignition temperature of the produced gas from the low temperature steam reforming reactor 8 is increased. It is, therefore, possible to raise the temperature of the gas that is fed to the catalytic partial oxidation reactor 15. Consequently, it is possible to reduce the amount of oxygen required for the catalytic partial oxidation reaction. For example, while the ignition temperature of source gas at the inlet of the low temperature steam reforming reactor 8 is about between 250° C. and 350° C. depending on the composition thereof, the autogenous ignition temperature of the produced gas at its outlet is increased to about between 450° C. and 530° C.

In addition, relatively inexpensive catalysts (e.g., nickel) can be used as the catalyst uses in the low temperature steam reforming reaction. It is possible to reduce degradation of the catalyst in the catalytic partial oxidation reactor 15 cased by sulfur by using such inexpensive catalysts in a large amount to collect the sulfur remaining in the source gas.

Hereinafter, specific examples will be described.

Conventional Example 1

1.73 $Nm^3$/hour of natural gas that had been desulfurized through a desulfurization device to a sulfur content of 10 ppb or lower (methane:ethane:propane:n-butane:iso-butane:hydrogen=87:7:2.8:0.6:0.6:2 (mol %)) was mixed with 0.95 kg/hour of steam, which was then heated to 300° C. by means of a heater. The gas was further mixed with heated oxygen and was supplied to a catalytic partial oxidation reactor. The temperature of the mixed gas in the oxygen mixer was approximately 290° C.

This catalytic partial oxidation reactor was a tubular reactor that had a length of 1 m and an inner diameter of 22 mm, and included a catalyst bed formed therewithin, the catalyst bed having a catalyst having rhodium and nickel supported on alumina. Space having a length of 10 cm was defined above this catalyst bed and 3 mm-diameter ceramic balls were filled into this space.

When the mixing amount of oxygen with respect to the natural gas was gradually increased and the amount of oxygen reached 0.4 mol with respect to 1 mol of carbon, self combustion occurred in the space above the catalyst bed non-catalytically and the temperature in the space exceeded 1000° C. For those reason, the amount of mixed oxygen was reduced and the reaction was stopped. At this point, the temperature of the mixed gas in the oxygen mixer was 280° C., and the pressure of the reactor was 4 MPa.

Conventional Example 2

In order to increase the added amount of oxygen, the temperature of the steam mixed natural gas and the temperature of the added oxygen were decreased so that the temperature of the mixed gas in the oxygen mixer became 250° C., and the oxygen was supplied gradually and introduced to the catalytic partial oxidation reactor. No self combustion occurred in the part filled with the ceramic balls above the catalyst bed even when the oxygen was 0.6 mol with respect to 1 mol of carbon in the natural gas, and the intended catalytic partial oxidation reaction could be maintained.

Results of the analysis of the gases from the catalytic partial oxidation reactor after maintaining the reaction for 10 hours were as follows: methane:hydrogen:carbon monoxide:carbon dioxide:water=0.7:51.0:24.2:4.3:19.8 (mol %). The total production of hydrogen and carbon monoxide, which were the feedstock for the synthesis gas, was 5.1 $Nm^3$/hour. The ratio between the hydrogen and the carbon monoxide was about 2.1, which was appropriate for the feedstock for synthesis gases.

Example

A low temperature steam reforming reactor and a second heater were provided to the apparatus used in Conventional Examples between the heater for the steam mixed source gas and the oxygen mixer. The low temperature steam reforming reactor was a tubular reactor which had a length of 2 m and an inner diameter of 50 mm, and a catalyst bed having a catalyst having nickel supported on alumina.

The steam mixed natural gas at the same flow rate as those in Conventional Examples heated to 300° C. was supplied to the low temperature steam reforming reactor to cause the low temperature steam reforming reaction. Results of analysis on the reformed gas from the low temperature steam reforming reactor were as follows: methane:hydrogen:carbon dioxide:water=62.1:1.5:2.4:34.0 (mol %).

Substantially no hydrocarbons other than methane and carbon monoxide was found in this reformed gas.

This reformed gas was heated in the second heater, and heated oxygen was added at an amount of 0.53 mol per 1 mol of carbon contained in the gas, which was fed to the catalytic partial oxidation reactor. Although the temperature of the gas at the oxygen mixer in this point was 500° C., no self combustion occurred anywhere from the oxygen mixer to the upstream side of the catalytic partial oxidation reactor. The prescribed catalytic partial oxidation reaction was maintained.

Results of the analysis of the gases from the catalytic partial oxidation reactor after maintaining the reaction for 10 hours were as follows: methane:hydrogen:carbon monoxide:carbon dioxide:water=1.7:52.4:24.5:4.0:17.4 (mol %). The total production of hydrogen and carbon monoxide, which were the feedstock for the synthesis gas, was 5.1 $Nm^3$/hour. The ratio between the hydrogen and the carbon monoxide was about 2.1, which was appropriate for the feedstock for synthesis gases.

This Example shows that, because no hydrocarbons of carbon numbers of 2 or higher are contained in the outlet gas from the steam reforming reactor, the heating temperature upon mixing with oxygen can be increased, and consequently, it is possible to decrease the feed amount of oxygen required in order to obtain the same production amount of the synthesis gas. In other words, the amount of oxygen required per 1 mol of carbon was 0.6 mol in Conventional Example 2 whereas the amount was 0.53 mol in Example.

Comparative Example

After completing Example, the catalyst of the low temperature steam reforming reactor was replaced with a catalyst used for the catalytic partial oxidation so that the reactor was configured as a low temperature partial oxidation reactor and that oxygen could be provided right before the heater of the steam mixed natural gas. In other words, the apparatus was configured so that the catalytic partial oxidation reaction has two stages: low temperature and high temperature stages.

1.73 $Nm^3$/hour of desulfurized natural gas as in Conventional Examples and Example, was mixed with 0.95 kg/hour of steam. 0.06 mol of heated oxygen per 1 mol of carbon was added to the gas, and the mixed gas adjusted to 250° C. was supplied to the low temperature partial oxidation reactor.

No self combustion occurred anywhere from the oxygen mixer to the catalyst bed of the low temperature partial oxidation reactor. Therefore, while maintaining the reaction, 0.54 mol of oxygen per 1 mol of carbon was added to the produced gas from the low temperature partial oxidation reactor and was adjusted to 500° C., which was supplied to the high temperature partial oxidation reactor. This means that the total added amount of the oxygen was 0.6 mol per 1 mol of carbon. No self combustion was observed in the upstream of the high temperature partial oxidation reactor.

Results of analysis on the produced gas from the low temperature partial oxidation reactor after 10 hours of reaction were as follows: methane:hydrogen:carbon monoxide:carbon dioxide:water=54.0:8.5:0.3:5.5:31.7 (mol %).

Furthermore, results of analysis on the produced gas from the high temperature partial oxidation reactor were as follows: methane:hydrogen:carbon monoxide:carbon dioxide:water=0.6:51.2:24.4:4.1:19.7 (mol %). The total production of hydrogen and carbon monoxide, which were the feedstock for the synthesis gas, was 5.1 $Nm^3$/hour. The ratio between the hydrogen and the carbon monoxide was approximately 2.1, which was appropriate for the feedstock for synthesis gases.

This Comparative Example indicates that using catalytic partial oxidation reactions in two stages in combination was not effective in reducing the amount of oxygen required for obtaining the same amount of produced synthesis gas.

It should be noted that the present invention is applicable for cases in which a synthesis gas is produced from naphtha, liquefied petroleum gas (LPG), or the like.

Furthermore, the desulfurization reactor 2, the first heat exchanger 6, the second heat exchanger 11, and/or the mixer 12 in the apparatus shown in FIG. 1 are not essential and may be omitted. Furthermore, the catalytic partial oxidation reactor may be a multi-stage reactor having two or more stages, rather than a single stage, and may be a hybrid reactor of catalytic partial oxidation reaction and auto thermal reforming reaction (ATR).

The invention claimed is:

1. A method for producing a synthesis gas containing carbon monoxide and hydrogen from a source gas containing light hydrocarbons, comprising the steps of:

performing low temperature steam reforming by adding steam to the source gas and converting the hydrocarbons of carbon numbers of 2 or higher in the source gas to methane, thereby obtaining a reformed gas containing said methane;

premixing oxygen with said reformed gas;

feeding a mixed gas of the oxygen and the reformed gas to a catalytic partial oxidation reactor; and performing a catalytic partial oxidation to react the oxygen with the methane in said reformed gas, wherein the low temperature steam reforming is performed is a pressure set to be from normal pressure to 8 Mpa, an inlet temperature of the low temperature steam reforming reactor is set to be from 300 to 400° C., an outlet temperature of the low temperature steam reforming reactor is set to be from 400 to 550° C., and an amount of the added steam is set to be from 0.1 to 3.0 mol with respect to 1 mol of carbon in the source gas.

2. The method for producing a synthesis gas according to claim 1, wherein the added amount of the oxygen is set to 0.2 mol or more with respect to 1 mol of carbon in the source gas in the reactor for the catalytic partial oxidation.

3. The method for producing a synthesis gas according to claim 1, wherein the source gas is a natural gas, or naphtha, or a liquid petroleum gas.

4. The method for producing a synthesis gas according to claim 1, wherein nickel and/or ruthenium supported on a carrier of aluminum oxide is used as a catalyst for the low temperature steam reforming.

* * * * *